United States Patent [19]
Raitt

[11] 3,908,867
[45] Sept. 30, 1975

[54] APPARATUS FOR FLAVORING SOFT ICE CREAM BEING DISPENSED FROM A MACHINE

[76] Inventor: Edward D. Raitt, 5525 Blenheim St., Vancouver 14, British Columbia, Canada

[22] Filed: June 3, 1974

[21] Appl. No.: 475,870

[52] U.S. Cl. ............... 222/145; 222/214; 239/310
[51] Int. Cl.² ........................................ B67D 5/56
[58] Field of Search .................. 239/310; 137/268; 417/474–477; 222/129.1, 129.2, 145, 214, 135, 136

[56] References Cited
UNITED STATES PATENTS

| | | | |
|---|---|---|---|
| 2,669,945 | 2/1954 | Wildebour | 222/145 X |
| 3,182,860 | 5/1965 | Gallo | 222/145 X |
| 3,199,957 | 8/1965 | Vivion | 137/268 X |
| 3,272,388 | 9/1966 | Whitmore | 222/129.1 |
| 3,334,666 | 8/1967 | Vogt | 222/145 X |

*Primary Examiner*—Robert B. Reeves
*Assistant Examiner*—Francis J. Bartuska
*Attorney, Agent, or Firm*—Fetherstonhaugh & Co.

[57] ABSTRACT

An attachment for a delivery spout of a dispensing machine is adapted to support a wafer having a grid-like arrangement of flexible tubes provided with closed ends with outlets therebetween. The tubes are prefilled with a flavoring extract for the product to be dispensed by the machine. As the product passes through the spout as a controlled flow of a selected quantity, the product stream distorts the flexible tubes so as to extrude a portion of the flavoring extract for entrainment into the selected quantity.

6 Claims, 16 Drawing Figures

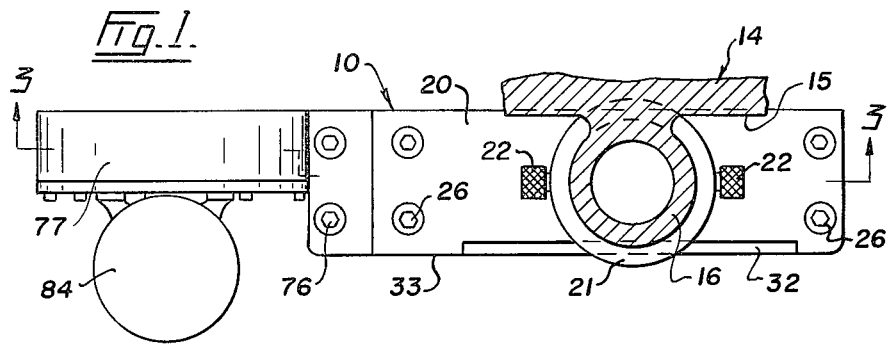
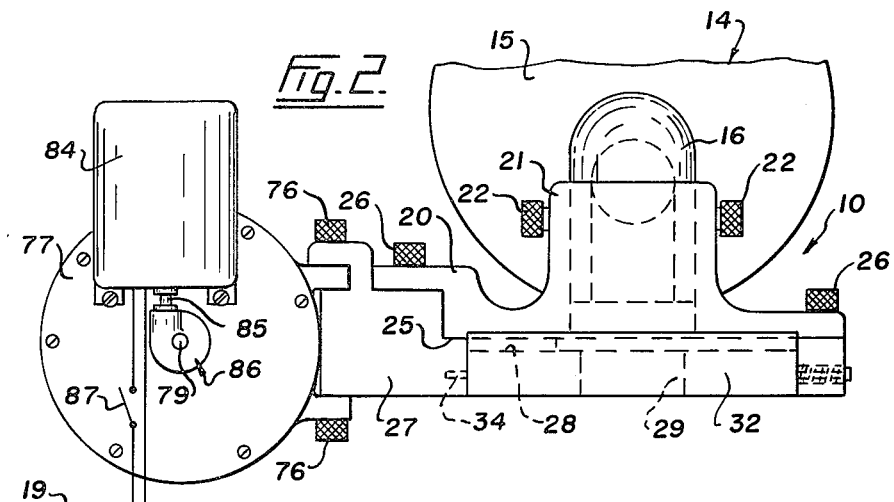
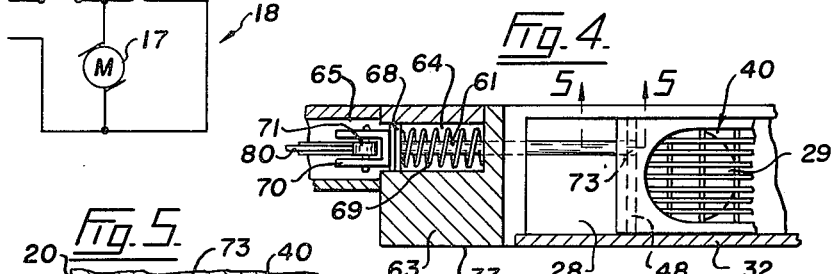
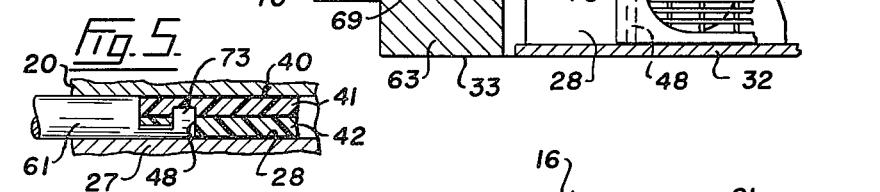
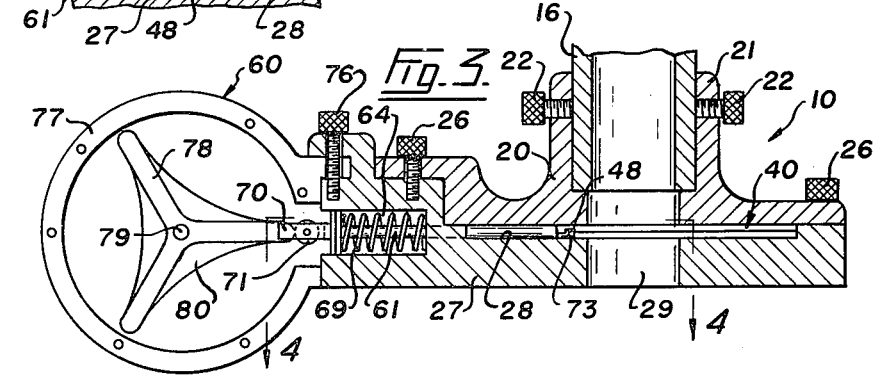

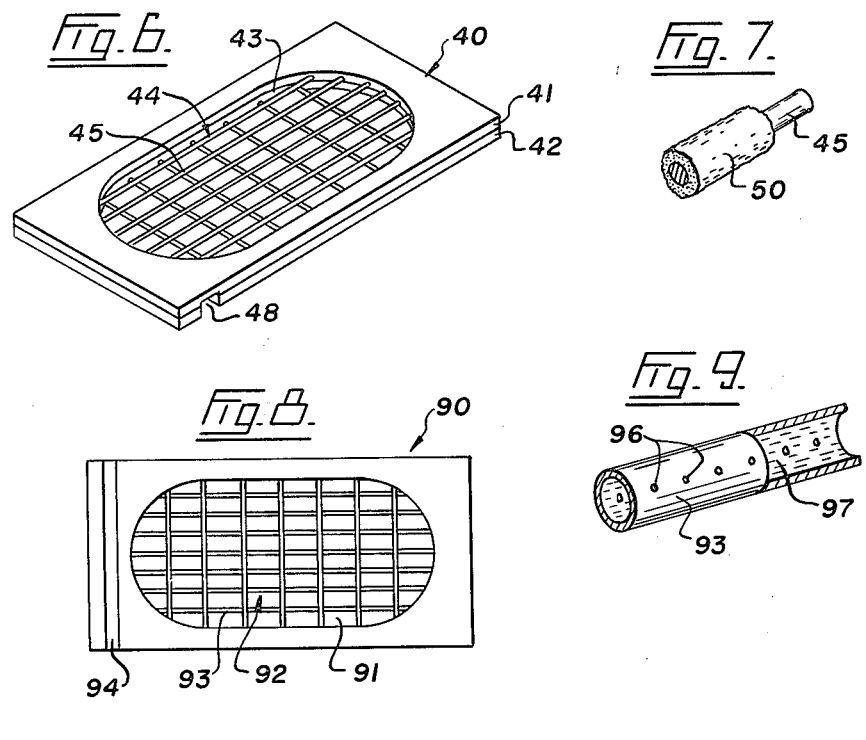
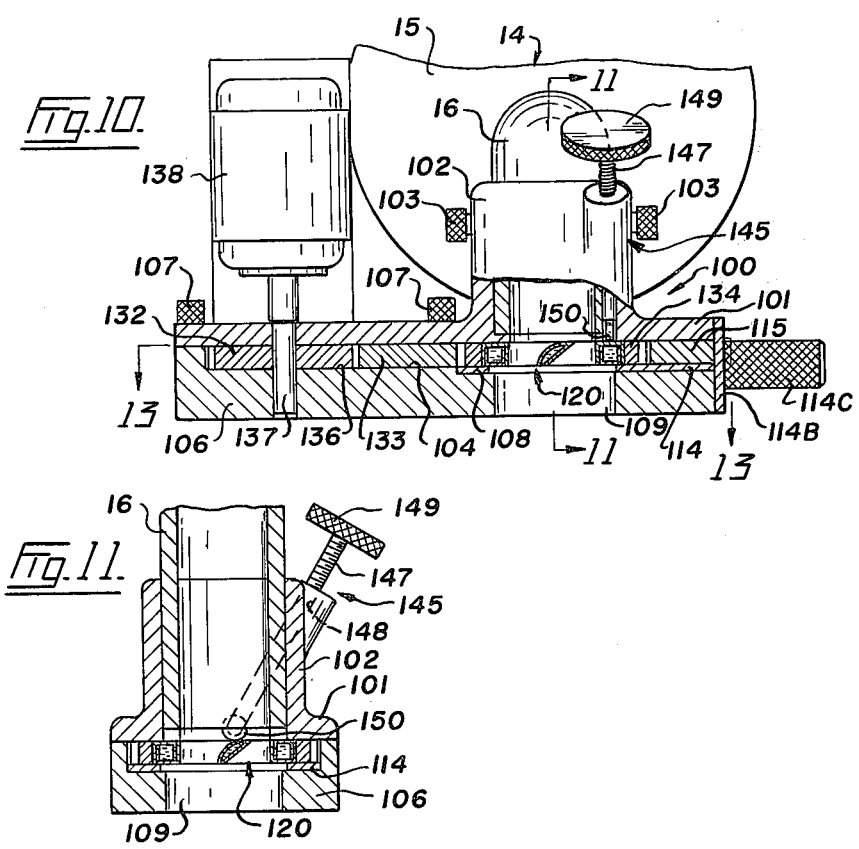

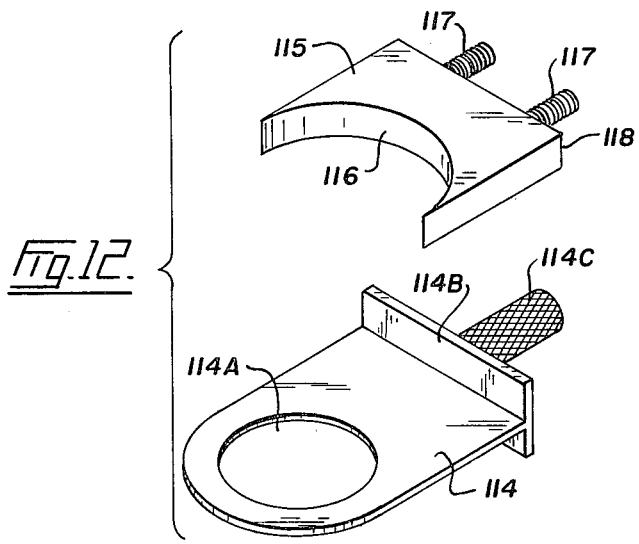
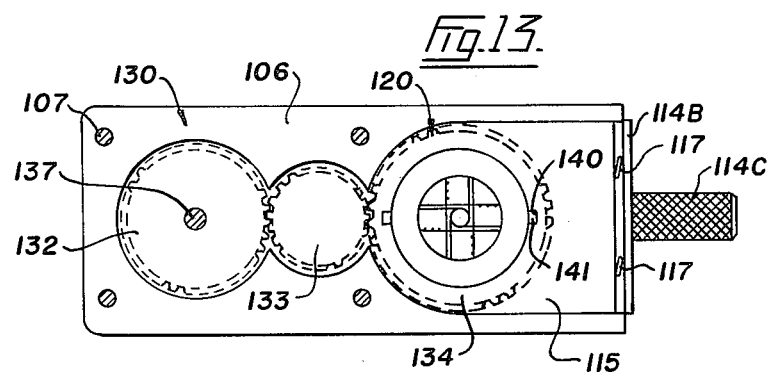
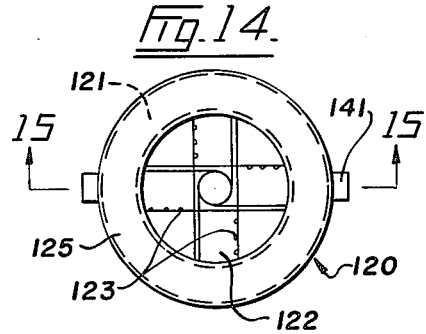
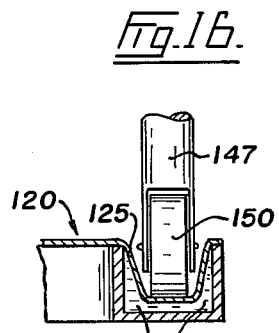
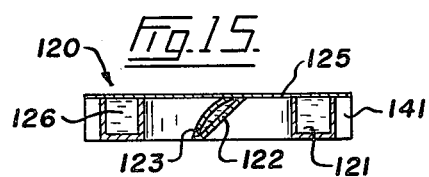

APPARATUS FOR FLAVORING SOFT ICE CREAM BEING DISPENSED FROM A MACHINE

This invention relates generally to means for flavoring a flowable food product and more particularly to apparatus for adding a flavor to soft ice cream or the like.

Presently known devices for introducing a flavoring ingredient into ice cream fail to spread the syrup evenly throughout each serving with the result that the product is variegated or multi-flavored as opposed to having a single distinct flavor as is usually desired. When an attempt is made to vary the flavor of individual servings according to the dictates of a succession of customers, it usually happens that the flavors become mixed to some extent at least and this is unsatisfactory to many customers. Finally the flavoring devices tend to resist the flow of ice cream from the dispenser and this can slow-up the dispensing operation which is quite an important factor in a busy ice cream parlour.

The present invention overcomes the abovementioned disadvantages of conventional flavoring devices and, in addition, provides a simple and relatively inexpensive attachment which can readily be fitted to a widely used soft ice cream dispensing machine whereby a series of servings of the product can quickly and easily be flavored individually to satisfy a number of customers. To achieve this, the ice cream retailer is provided with a supply of flavoring wafers such as chocolate, strawberry and so on whereby, when a customer's order is received, all that is necessary is to insert the appropriate wafer in the attachment and start the dispensing machine whereupon the flavoring is done automatically as the serving pours into a biscuit cone or dish.

In drawings which illustrate preferred embodiments of the invention,

FIG. 1 is a plan of the present apparatus attached to a dispensing machine part which is shown in section, FIG. 2 is a front elevation of the apparatus, FIG. 3 is a vertical section taken on line 3—3 of FIG. 1, FIG. 4 is a horizontal section taken on line 4—4 of FIG. 3, FIG. 5 is an enlarged vertical section taken on line 5—5 of FIG. 4, FIG. 6 is a perspective view of a flavoring wafer of the apparatus, FIG. 7 is a much enlarged perspective view of a portion of a filament carried by the flavoring wafer, FIG. 8 is a plan showing the underside of a modified wafer, FIG. 9 is a much enlarged perspective of a portion of a filament of the modified wafer, FIG. 10 is a front elevation, part in section, of another embodiment of the invention, FIG. 11 is a vertical section taken on the line 11—11 of FIG. 10, FIG. 12 is an exploded perspective view of a tray assembly of the FIG. 11 embodiment, FIG. 13 is a horizontal section taken on the line 13—13 of FIG. 10, FIG. 14 is a plan of a disc-type flavoring wafer used in the FIG. 11 embodiment, FIG. 15 is a vertical section taken on the line 15—15 of FIG. 14, and FIG. 16 is an enlarged transverse section of the disc-type wafer showing part of a presser means of the apparatus.

Referring to the drawings, one embodiment of the present invention is shown to comprise an attachment which is generally indicated by the numeral 10. The attachment 10, see FIGS. 1 to 5, is intended for use on a soft ice cream dispensing machine 14 which has a front-wall part 15 fitted with a delivery spout 16. Normally, a dispensing machine of this type is powered by an electric motor 17 having a circuit 18 (FIG. 2) which includes a control switch 19 actuated by a foot pedal, not shown. When the dispenser motor 17 is started, a stream of soft ice cream is discharged vertically downwards out of the spout 16 and into a cone or dish held directly below the spout.

The attachment 10 for such a machine 14 comprises a body 20 provided with an upstanding sleeve 21 which fits over the spout 16 and is secured thereto by means of knurled clamping screws 22. This generally rectangular (FIG. 1) body 20 has a horizontal lower face 25 and secured to this face by bolts 26 is a bottom plate 27. A rectangular recess 28 is formed in the upper face of the plate 27 and a discharge opening 29 extends vertically through this recessed part of the plate directly below the delivery spout 16. Normally, the recess 28 is covered by a spring-pressed flap 32 which is pivotally mounted on front edge 33 of the plate 27. Recess 28 is open to edge 33 of the bottom plate when the flap 32 is swung forwardly and downwardly about its horizontal pivot 34.

Referring now particularly to FIGS. 6 and 7, the numeral 40 indicates one type wafer is inserted into the recess 28 to add a particular flavor to the soft ice cream dispensed from the machine 14. The flavoring wafer 40 comprises a laminated structure preferably made up of two layers 41 and 42 (FIG. 6) which are suitably secured together in face to face contact as shown. Wafer 40 has a substantially oval-shaped or elongated opening 43 which is bridged by a grid 44 formed of filaments 45. These filaments 45 may be made of very fine wire or plastic and conveniently, the opposite ends of the longitudinally extending filaments are anchored to the layers 41 while the corresponding ends of the tranversely extending filaments are similarly secured to the layer 42, thus forming the aforesaid grid 44 across the opening 43. A groove 48 is provided on the underside of the wafer 40 near one end edge thereof, this shallow and rectangular groove being parallel to the end edges of the wafer.

FIG. 7 is a much enlarged cross-section of a filament 45 and it will be seen to be coated with a flavoring extract 50. This extract is applied to the filaments by a dipping and drying process which provides a coating on the filaments which is easily broken away by a stream of ice cream passing through the elongated opening 43. Thus, the filaments 45 are spaced-apart carriers of the flavoring material.

In order to ensure that the flavoring is spread throughout each serving of ice cream, the attachment 10 is provided with means 60 for reciprocating the wafer 40 back and forth in the recess 28. The drive means generally indicated at 60 is shown to comprise a plunger 61. An enlargement 63 is formed on the left end (i.e. FIG. 1) of the bottom plate 27 and this enlargement is provided with a bore 64 and a counterbore 65. The plunger 61 is slidably mounted in the bore 64 with opposite ends of the horizontally disposed plunger projecting into the recess 28 and the counterbore 65. Within the counterbore, a collar 68 and a spring 69 are fitted to the plunger to urge it outwardly. Adjacent the collar, the plunger has a fork 70 which journals a vertically disposed roller 71. The opposite or inner end of the plunger 61 is provided with a transverse rib 73 which is adapted to slidably enter the groove 48 of the flavoring wafer.

Secured to the enlargement 63 by bolts 76 is a housing 77 which encloses a cam wheel 78, this wheel being mounted on a shaft 79 journalled in said housing. The cam wheel 78 is provided with a substantially triangular cam track 80 which enters between the sides of the fork 70 and around which the roller 71 runs when the cam wheel is rotated. To rotate the wheel 78, an electric motor 84 is secured to the housing 77 and drive shaft 85 of this machine is connected by a worm geared drive generally indicated at 86 to the shaft 79. The motor 84 is connected into the circuit 18 to the dispenser motor 17 whereby to be controlled partly by the switch 19 and partly by another switch 87 (FIG. 2) in said circuit. Switch 87 is normally open and is closed in response to a predetermined drop in temperature. The bimetallic switch 87 is suitably positioned on the attachment 10 whereby to be closed just as the leading end of the ice cream stream being discharged from the spout 16 approaches the wafer 40.

An ice cream dispensing machine fitted with the attachment 10 is operated in the following manner. Assuming the ice cream retailer receives an order for a serving of strawberry ice cream, he takes a strawberry flavoring wafer 40 and inserts it into the recess 28 so that the rib 73 enters the slot 48. The switch 19 controlling the dispenser motor is closed to start a stream of soft ice cream through the spout 16. Switch 87 is closed by the temperature drop resulting from the flowing ice cream and this also energizes the motor 84 so that the wafer is reciprocated as the ice cream flows through the grid 44. This reciprocating action spreads the flavoring extract 50 through the serving since the extract is broken away as a fine powder by the passage of the ice cream over and around the filaments 45. The wafer 40 is intended to be discarded after a single serving.

In FIGS. 8 and 9 there is shown a modified form of flavoring wafer which is generally indicated at 90. The wafer 90 prerably is of the two-layer construction previously described as being used to make the wafer 40 and the former wafer has a similar opening 91, a grid 92 made up to filaments 93, and an end groove 94. Each flavor carrier or filament 93 is a small-diameter tube of plastic or other suitable material which is quite easily flexed and regularly spaced along the sides of this tubular filament are an appropriate number of tiny outlets 96. The opposite ends of each filament 93 are closed by virtue of their mounting within the layers which form the wafer 90 but, before assembly, the filament is filled with a desired flavoring syrup 97 as represented by the liquid-indicating lines in FIG. 9. This syrup 97 is thick enough not to weep through the outlets 96 unless the filaments are actually squeezed.

In use, a retailer of ice cream would keep in stock a supply of the wafers 90 for each flavor and his machine 14 is fitted with the previously described attachment 10. A wafer 90 of the requested flavor is inserted into the attachment 10 by folding down the flap 32 to admit the wafer into the recess 28 and positioning said wafer so that one end of the opening 91 is in register with the base of the spout 16 when the plunger rib 73 is lodged in the groove 94. When the dispensing machine is started in the usual manner, the motor 84 subsequently is energized by the closing of switch 87 and the wafer 90 is reciprocated through the ice cream stream. The flow of ice cream causes the grid 92 to sag slightly under the resulting pressure and this results in the filaments 93 being distorted and squeezed so as to extrude the syrup 97 through the outlets 96. Thus the flavoring extract is spread through the serving of ice cream and the wafer 90 may be discarded after the single serving.

The embodiment of the invention shown in FIGS. 10 to 16 comprises an attachment 100 which is secured to the delivery spout 16 as before. For this purpose, the attachment 100 is provided with a body 101 having an integral sleeve 102 which fits over the spout 16 and is secured thereto by clamping screws 103. A bottom plate 106 is attached to the body 101 by bolts 107 and this plate is provided with a recess 108 and discharge opening 109 in register with the bore of the spout 16.

The right end of the recess 108 is open to receive a slidably mounted tray 114 having an opening 114A which registers with the discharge opening 109 when the tray is pushed all the way into the recess. As shown best in FIG. 12, the tray 114 has an outer end flange 114B fitted with a handle knob 114C. This flange 114B serves as an abutment for an insert 115 which has an arcuate inner edge 116 conforming to the curvature of the opening 114A. Compression springs 117 are fitted to outer edge 118 of the insert to bear against the flange 114B and apply inward pressure to said insert.

The tray 114 is adapted to support a modified form of the flavoring wafer which is the annular disc 120 shown best in FIGS. 14, 15 and 16. Disc 120 may be made of plastic or other thin, lightweight material which is shaped to provide a circular channel 121 which is substantially U-shaped in cross section. Hollow blades 122 extend across the disc and these blades 122 are inclined at an acute angle to the intended direction of rotation of the disc as shown best in FIG. 15 whereby they have a positive pitch in the intended direction of rotation of said disc. Outlets 123 are provided along the lower, trailing edges of the blades. The channel 121 is covered by a thin, flexible membrane 125 and said channel is filled with a flavoring syrup 126 which can be forced through the hollow blades 122 and out the outlets 123 by depressing said top membrane. The channel and the hollow blades of the disc 120 are the flavor carriers in this instance.

Flavoring disc 120 is adapted to be rotated in the stream of ice cream flowing from the spout 16 by means generally indicated at 130. The drive means 130 is shown in FIGS. 10 and 13 to comprise gears 132, 133 and 134. Drive gear 132 rotates in a depression 136 formed in the bottom plate 106 and said gear is secured to drive shaft 137 of an electric motor 138, the motor being mounted on the body 101. Intermediate gear 133 is rotatably housed within another bottom plate depression 104 and permanently is in mesh with the gear 132. The hollow ring gear 134, which is supported within the recess 108 by the tray 114, is provided with diammetrically opposed keyway slots 140 (FIG. 13) into which keys 141 form on the flavoring disc 120 are entered so that said disc will rotate with the ring gear when the motor 138 runs to drive the intermeshing gears 132 and 133.

To load the attachment 100 with a disc 120 of the desired flavor, the tray 114 is pulled out far enough to allow said disc to be placed within the ring gear 134 with the keys 141 lodged in their slots. The tray is then shut and is held by friction against withdrawal, the spring-pressed insert 115 then applying sufficient resilient pressure to hold the gear 134 properly in mesh with the gear 133. At this time, the disc 120 is disposed vertically below the spout 16 and ice cream must flow through the annular disc as it is rotated by the drive means 130 in order to discharge from the bottom plate opening 109.

The syrup is adapted to be forced from the rotating disc 120 by pressure means generally indicated at 145. As shown best in FIGS. 10, 11 and 16, the means 145 comprises an inclined bolt 147 which extends through a hole 148 drilled and tapped into the body 101 near the base of the sleeve 102. An operating knob 149 is fitted to the outer end of this bolt the inner end of which projects into the recess 108 where it is fitted with a roller 150.

To dispense soft ice cream from a machine 14 fitted with the attachment 100, a disc 120 containing the flavor which has been ordered is loaded by manipulation of the tray 114 as previously described whereupon the dispenser motor 17 is started. The moment thermal switch 87 closes, the motor 138 starts as well and the disc 120 is rotated through the ice cream stream. However, just before this rotation occurs, the knob 149 is turned to advance the bolt 147 so that the roller 150 will depress the flexible membrane 125 into the channel 121. This action forces the syrup 126 from the outlets 123 and into the stream of ice cream where it is mixed by the rotation of the flavoring disc. The operator judges from the color of the ice cream being discharged whether or not sufficient flavor has been added and, if more flavor is required, he continues to advance the bolt 147 whereby to increase the flow from the blade outlets 123. When the dispenser motor later is shut off, the drive means 130 stop also and the empty disc can be replaced by a full one of the same or another flavor.

It will be noted that the rotating blades 122 serve to draw the stream of ice cream out of the spout 16 whereby to reduce the back pressure normally developed within the dispensing machine as it pumps the semi-frozen product. The motor 138 is run at a suitably slow rate to provide proper control over the distribution and intensity of the flavoring.

I claim:

1. Apparatus for flavoring soft ice cream or the like moving as a stream through a delivery spout of a dispensing machine, comprising a flavoring wafer attachable to the delivery spout and having spaced carriers supported in the path of the ice cream stream, and a flavoring material contained by the spaced carriers adapted to be picked up by and dispensed through the steam, said spaced carriers being flexible tubes having closed ends and longitudinally spaced outlets, said flavoring material being a fluid placed within the flexible tubes prior to the closing of the closed ends thereof and being extruded through the spaced outlets as said tubes are flexed by the ice cream stream.

2. Apparatus as claimed in claim 1, in which said flexible tubes are arranged as a grid through which the ice cream stream must pass prior to discharging from the delivery spout.

3. Apparatus as claimed in claim 1, and including an attachment mountable on the dispensing machine for releasably securing the flavoring wafer to the delivery spout.

4. Apparatus as claimed in claim 3, and including drive means on the attachment for moving the flavoring wafer through the stream.

5. Apparatus for flavoring soft ice cream or the like moving as a stream through a delivery spout of a dispensing machine, comprising an attachment mountable on the dispensing machine for releasably securing the flavoring wafer to the delivery spout, said flavoring wafer being a disc rotatably mounted in the attachment and having an opening through which the ice cream stream passes prior to discharging from the delivery spout, said disc having an annular channel encircling the opening and being partly defined by a flexible wall, said spaced carriers including hollow blades bridging the opening and having outlets in communication with the annular channel, said flavoring material being a fluid normally contained in the annular channel, and presser means for deforming the flexible wall as the disc is rotated by the drive means whereby to extrude the fluid flavoring material through the outlets and into the stream, and including drive means associated with the attachment for moving the flavoring wafer through the stream.

6. Apparatus as claimed in claim 5 in which said hollow blades are disposed at an acute angle to the direction of rotation of the disc whereby to assist the flow of ice cream through the delivery spout.

* * * * *